July 10, 1962 W. L. MARTIN 3,043,907
NAVIGATION DEVICE
Filed Jan. 19, 1950 3 Sheets-Sheet 1

INVENTOR.
WESLYE L. MARTIN
BY
ATTORNEY

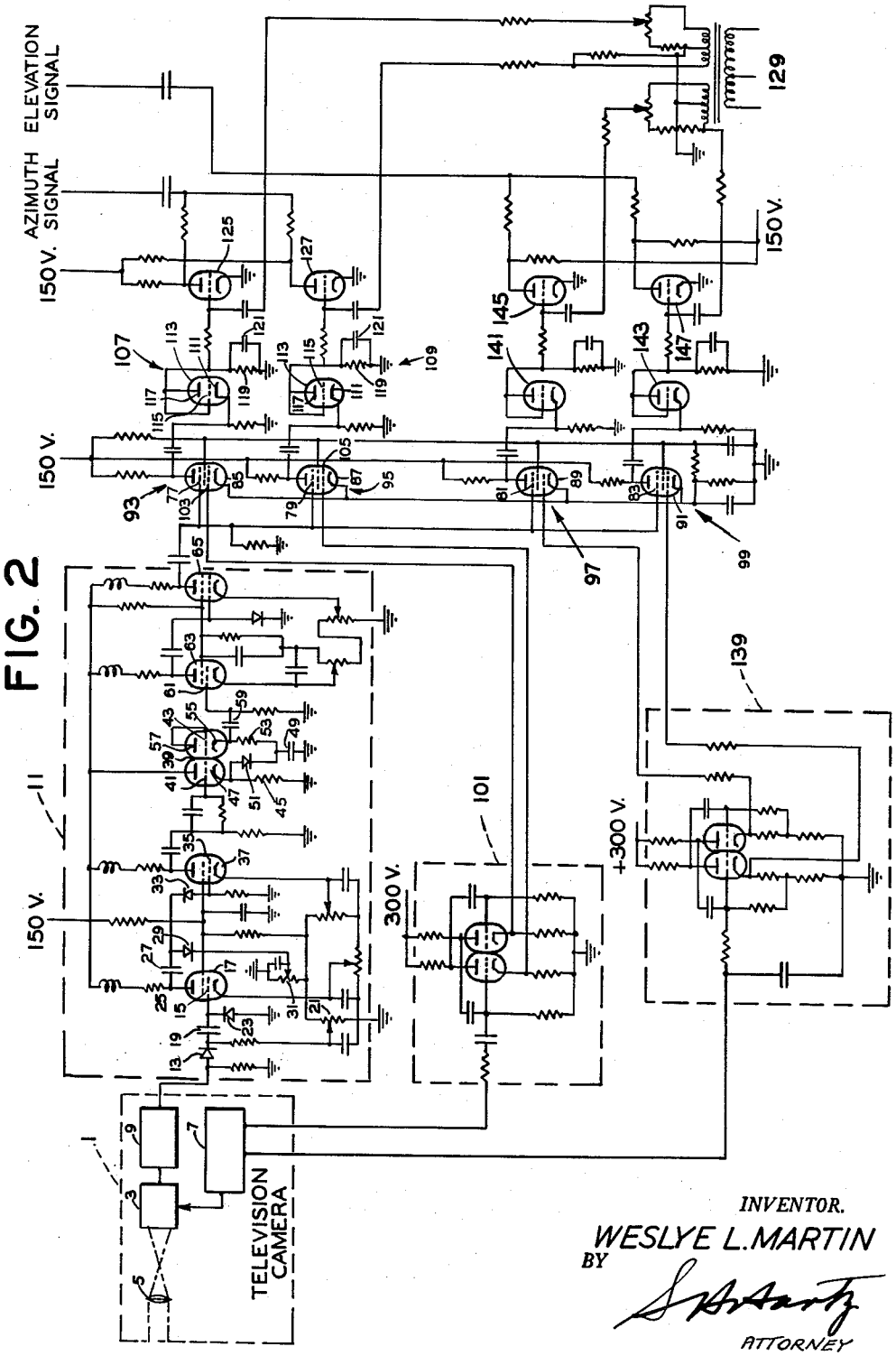
FIG. 2
INVENTOR.
WESLYE L. MARTIN
BY
ATTORNEY

July 10, 1962 W. L. MARTIN 3,043,907
NAVIGATION DEVICE
Filed Jan. 19, 1950 3 Sheets-Sheet 3
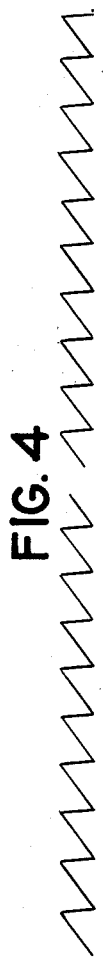
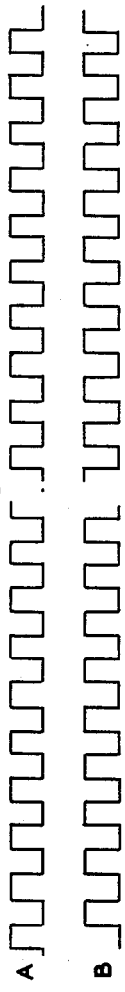
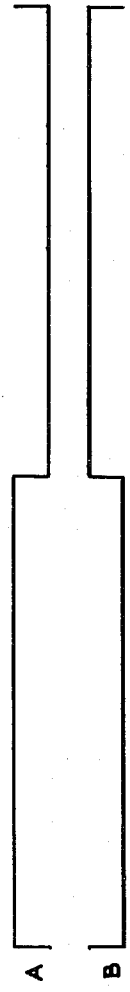
FIG. 4
FIG. 5
FIG. 6
FIG. 7
FIG. 8
FIG. 9
FIG. 10
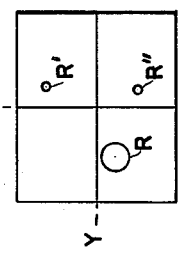
FIG. 3
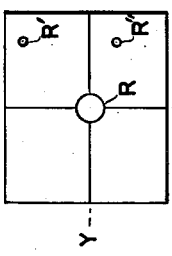
FIG. 11
INVENTOR.
WESLYE L. MARTIN
BY
ATTORNEY

United States Patent Office 3,043,907
Patented July 10, 1962

3,043,907
NAVIGATION DEVICE
Weslye L. Martin, Hasbrouck Heights, N.J., assignor to The Bendix Corporation, a corporation of Delaware
Filed Jan. 19, 1950, Ser. No. 139,377
8 Claims. (Cl. 178—6.8)

The invention relates to navigation systems, and more particularly to an automatic navigation device in which one or more celestial bodies may be used as a reference.

One object of the invention is to provide a celestial navigator for automatically guiding ships, aircraft or other moving vehicles on a prescribed course.

Another object is to provide a device for indicating the location of the ship, aircraft or other moving vehicle on which the device is mounted.

A further object is to provide a relatively simple celestial navigator of high accuracy.

Another object is to provide a device which automatically selects the brightest reference within a relatively broad field and centers the device on the reference.

Another and still further object is to provide a novel amplifier which selectively passes the greatest signal amplitude and suppresses or discriminates against lesser signal amplitudes.

A still further object is to provide a plurality of amplifiers gated by voltages synchronized with the horizontal and vertical sweep voltages to distinguish portions of the signal corresponding to the several quadrants of an image of the field.

The invention contemplates a television camera including means, such as a telescope, or lens, directed to a reference in a contrasting field and providing an image of the field. Scanning means energized by sweep voltages causes the electron beam from a pickup tube to scan the image and the pickup tube produces an electrical signal corresponding to the image.

A plurality of amplifiers responsive to the signal are gated in synchronism with the scanning means to alternately pass and block the signal. Each of the amplifiers passes the signal corresponding to one-half of the image and blocks the signal corresponding to the other half of the image; that is, one amplifier passes the signal corresponding to the upper half of the image, a second amplifier passes the signal corresponding to the lower half of the image, a third amplifier passes the signal corresponding to the right half of the image, and a fourth amplifier passes the signal corresponding to the left half of the image. A servo system responsive to the differential output of the first and second pairs of amplifiers and a second servo system responsive to the differential output of the third and fourth amplifiers directs the viewing means about mutually perpendicular axes to the reference.

To detect the brightest reference in the field, the signal from the television camera may be impressed on a selective amplifier which amplifies the largest signal amplitude corresponding to the brightest reference and suppresses or discriminates against smaller signal amplitudes corresponding to weaker references. The modified signal then is impressed on the gated amplifiers as described above. After the viewing means is centered on the brightest image in the field by the servo system, the viewing means may be adjusted, as by changing the focal length of the lens system, to further magnify the image for greater accuracy.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the drawings:

FIGURE 2 is a wiring diagram of a portion of the device shown in FIGURE 1.

FIGURE 3 shows an image of an instantaneous field with three references.

FIGURES 4 and 5 show the wave forms of the horizontal and vertical sweep voltages for scanning the image of FIGURE 3.

FIGURE 6 shows the signal wave form for one scansion of the image of FIGURE 3.

FIGURES 7A and 7B show the square wave voltages for gating the left and right gated amplifiers to alternately block and pass the signal shown in FIGURE 6.

FIGURES 8A and 8B show the square wave voltages for gating the up and down gated amplifiers to alternatively block and pass the signal shown in FIGURE 6.

FIGURES 9A and 9B show the outputs of the left and right gate amplifiers in response to the signal of FIGURE 6.

FIGURES 10A and 10B show the outputs of the up and down gate amplifiers in response to the signal of FIGURE 6.

FIGURE 11 shows an image of the field with the brightest reference image centered in the field.

Figure 1:
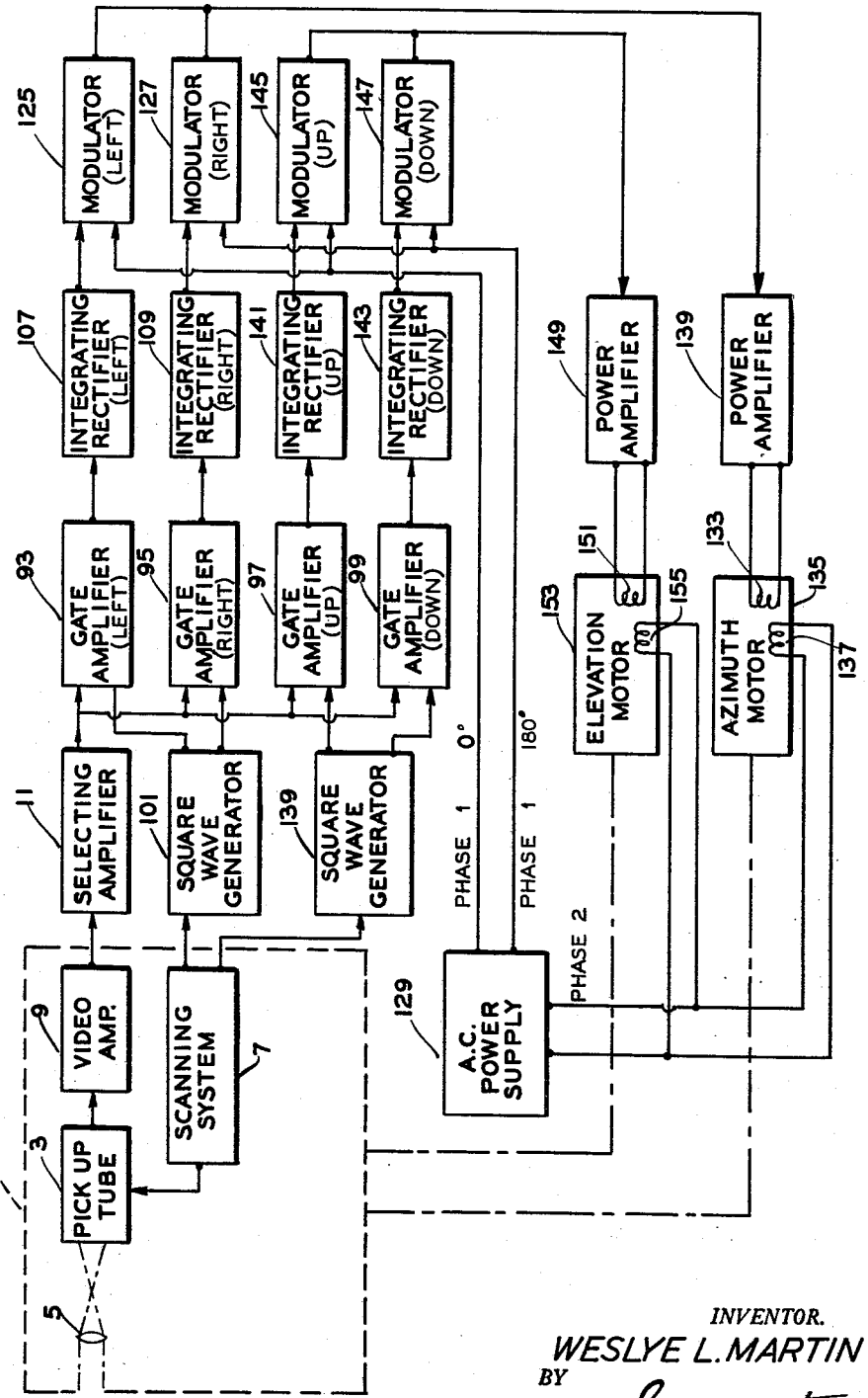
FIGURE 1 is a schematic electrical block diagram showing a novel navigation device constructed according to the invention.

Referring now to the drawings for a more detailed description of the novel navigation device of the present invention, the device is shown in FIGURES 1 and 2 as including a television camera 1 rotatable about mutually perpendicular axes and which may correspond generally to Airborne Conversion Unit PH–548/AXT–2A. The camera may include a telescope lens system 5 directed to a selected field, having one or more references R, R', R" of different intensities, and providing an image of the field, as shown in FIGURE 3. A scanning system 7 provides horizontal and vertical sweep voltages, as shown in FIGURES 4 and 5, to the electron beam of a pickup tube 3, such as an image orthicon, for scanning the image, and converts the image to an electrical signal shown in FIGURE 6. The resulting electrical signal is amplified by a video amplifier 9.

A selecting amplifier 11 receives the amplified signal from video amplifier 9 and amplifies the largest signal amplitude corresponding to the brightest reference R (FIGURE 3) and discriminates in successive stages against the smaller signal amplitudes corresponding to weaker references R', R", and which are suppressed or are not amplified to the same extent as the largest signal amplitude.

The selective amplifier includes a rectifier 13 connected through a condenser 19 to the grid 15 of a pentode 17. Rectifier 13 may be of germanium, silicon, selenium, copper oxide, etc., and has a non-linear resistance voltage characteristic so that it offers a lower resistance to positive signals of one or two volts than for smaller positive signals or negative signals. This non-linear characteristic provides for the passage of positive signals in the above range and the partial or complete blocking of all other less positive or negative signals. Rectifier 13 provides the first stage of discrimination by passing to grid 15 only positive signals greater (usually by one or two volts) than the positive bias of potentiometer 21. Grid 15 is connected to ground through a rectifier 23, similar to rectifier 13, which prevents the grid from assuming a negative potential relative to ground.

Plate 25 of tube 17 is connected through a condenser 27, a rectifier 29, and a bias potentiometer 31 to ground and through condenser 27 and a rectifier 33 to the control grid 35 of a pentode 37. Potentiometer 31 and rectifier 29 maintain the charge on condenser 27 at a predetermined potential to maintain the signal pulse corresponding to the reference at a uniform amplitude. Also, rectifier 33 provides the second stage of discrimination by passing only negative signals and by attenuating smaller signal amplitudes to a greater extent than the larger signal amplitudes to increase the amplitude difference.

A cathode follower and rectifier including a double triode 39 provides the final stage of voltage discrimination. The twice-discriminated amplified output of pentode 37 is impressed on both grids 41, 43 of double triode 39, and a voltage develops across a resistor 45 connected to the cathode 47 of tube 39. A condenser 49 is charged through a rectifier 51 by the voltage across resistor 45 in response to peak signal amplitudes corresponding to the brightest reference. Rectifier 51 provides for current flow while charging condenser 49 and substantially prevents discharge of condenser 49 between the charging pulses.

The charge on condenser 49 is proportional to the largest signal amplitude and the voltage across the condenser is applied through a resistor 53 to the cathode 55 of double triode 39. Plate 57 of double triode 39 is connected to grids 41, 43 so that one-half of the double triode 39 acts as a rectifier. Current flows from cathode 55 through resistor 53 to condenser 49 only when the signal amplitude exceeds the voltage of condenser 49—that is, for the brightest reference in the field. The output of the rectifier portion of tube 39 is impressed through a coupling condenser 59 on grid 61 of an amplifier tube 63, and the output of tube 63 is further amplified by a tube 65.

The discriminated amplified signal is impressed on suppressor grids 77, 79, 81 and 83 of tubes 85, 87, 89 and 91 of a left gate amplifier 93, a right gate amplifier 95, an up gate amplifier 97 and a down gate amplifier 99, respectively.

A square wave generator 101 is synchronized with scanning system 7 and produces a square wave voltage (see FIGURE 7) having the same frequency as the horizontal sweep voltage. One phase of the square wave voltage is shown in FIGURE 7A, and is applied to the control grid 103 of tube 85 of left gate amplifier 93 and the opposite phase of the square wave voltage is shown in FIGURE 7B and is applied to control grid 105 of tube 87 of right gate amplifier 95. The square wave voltage from generator 101 is synchronized with the horizontal sweep voltage so that the square wave voltage changes polarity when the electron sweep of the image orthicon is on the vertical center line X of the field image. The square wave voltage gates amplifiers 93, 95 so that the output of left gate amplifier 93 (FIGURE 9A) corresponds to the portion of the signal representing the left half of the field image—that is, the portion to the left of the vertical center line X, as viewed by the image orthicon, and so that the output of right gate amplifier 95 (FIGURE 9B) corresponds to the portion of the signal representing the right half of the field image—that is, the portion of the image to the right of the vertical center line X, as viewed by the image orthicon.

The output voltages of left gate amplifier 93 and right gate amplifier 95 are fed to left and right integrating rectifiers 107, 109. Each integrating rectifier includes a rectifier triode 113 having its grid 115 connected to its plate 117. The output voltage from the associated gated amplifier is fed to cathode 111 of triode 113 and the rectified voltage is integrated by an integrating circuit in the plate circuit including a resistor 119 and a condenser 121 in parallel therewith. The integrating circuit requires several signal pulses corresponding to several complete scansions of the field image to charge condenser 121.

Modulators 125, 127, are controlled by the rectified integrated outputs of integrating rectifiers 107, 109, respectively. Opposite phases of a carrier voltage from an alternating power source 129 are applied to modulators 125, 127 and the differential output of the modulators is amplified by a power amplifier 139 (FIGURE 1). The amplified differential output of modulators 125, 127 is impressed on the variable phase stator winding 133 of a motor 135 for driving camera 1 in azimuth about a vertical axis. The fixed phase 137 of motor 135 is energized by the second phase of power source 129.

When the brightest reference image R is to the left or to the right of the vertical center line X of the field image, the differential output of modulators 125, 127 either lags or leads the voltage from power supply 129 by 90°, as determined by the direction of displacement of the reference image from the vertical center line, whereupon azimuth motor 135 rotates camera 1 to the left or to the right until the reference image is aligned with the vertical center line, as shown in FIGURE 11, whereupon the differential output of modulators 125, 127 drops to zero and azimuth motor 135 stops.

A square wave generator 139 is synchronized with the scanning system and produces a square wave voltage (FIGURE 8) having the same frequency as the vertical sweep voltage (FIGURE 5). One phase of the square wave voltage shown in FIGURE 8A is applied to up gate amplifier 97 and the opposite phase of the square wave voltage shown in FIGURE 8B is applied to down gate amplifier 99. The square wave voltage from generator 139 is synchronized with the vertical sweep voltage so that the square wave voltage changes polarity when the electron sweep of the image orthicon is on the horizontal center line Y of the field image. The square wave voltage gates amplifiers 97, 99 so that the output of up gate amplifier 97 corresponds to the portion of the signal above the horizontal center line, and so that the output of down gate amplifier 99 corresponds to the portion of the signal below the horizontal center line. The output voltages of up gate amplifier 97 and down gate amplifier 99 are fed to integrating rectifiers 141, 143, and their outputs control modulators 145, 147 excited by opposite phases of the carrier voltage from alternating power source 129. The differential output of modulators 145, 147 is amplified by a power amplifier 149 and the amplified output is impressed on the variable phase stator winding 151 of a motor 153 for driving camera 1 in elevation about a horizontal axis. The fixed phase 155 of motor 153 is energized by power source 129.

When the brightest reference image R is above or below the horizontal center line, the differential output of modulators 145, 147 either lags or leads the voltage from power supply 129 by 90°, as determined by the direction of displacement of the brightest reference image from the horizontal center line, whereupon elevation motor 153 rotates camera 1 upwardly or downwardly until the reference image is aligned with the horizontal center line, as shown in FIGURE 11, whereupon the differential output of modulators 145, 147 drops to zero and elevation motor 153 stops.

After the camera is centered on the brightest reference R in the field, the lens system 5 of the telescope may be changed to increase magnification of the image field, and thereafter, the device will more accurately maintain the selected reference image coincident with the intersection of vertical and horizontal center lines X, Y.

A suitable indicator (not shown) may be provided to indicate the angular bearing of the camera relative to a reference index and by providing two such devices directed to different stars the position of the craft mounting the devices may be determined automatically at all times. Also, instead of driving the camera in azimuth and elevation relative to the craft on which the device is mounted, the camera may be fixed to the craft and the azimuth and elevation motors may be drivingly connected to the azimuth and elevation controls of the craft to automatically guide the craft on a predetermined course.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a device of the kind described, a television camera having viewing means adapted to be directed to a field including a reference and to provide an image of the field, and scanning means energized by sweep voltages for scanning the image, said camera producing an electrical signal corresponding to the image, a plurality of means responsive to the signal and gated in synchronism with the scanning means to alternately pass and block the signal, each of said means passing the signal corresponding to one-half of the image and blocking the signal corresponding to the other half of the image, and a servo system responsive to the differential output of pairs of said gated means for centering said viewing means on the reference.

2. In a device of the kind described, a television camera including viewing means adapted to be directed to a field including a reference and to provide an image of the field, and scanning means energized by sweep voltages for scanning the image of said camera and producing an electrical signal corresponding to the image, a selective amplifier receiving the signal and adapted to increase the signal amplitude corresponding to the reference and to suppress the signal amplitudes corresponding to the remainder of the field, a plurality of means gated in synchronism with the scanning means and receiving the output of said selective amplifier and alternately passing and blocking said output, each of said means passing said output corresponding to one-half of the image and blocking said output corresponding to the other half of the image, and a servo system responsive to the differential output of pairs of said gated means for centering said viewing means on the reference.

3. In a device of the kind described, a television camera including viewing means adapted to be directed to a field including a reference and to provide an image of the field, scanning means energized by sweep voltages for scanning the image, said camera producing an electrical signal corresponding to the image, a pair of means gated in synchronism with the scanning means and receiving the output of said selective amplifier and alternately passing and blocking said output, one of said means passing said output corresponding to one-half of the image above a horizontal center line, another of said means passing said output corresponding to one-half of the image below the horizontal center line, and a servo system responsive to the differential output of said pair of gated means for centering said viewing means about a horizontal axis on the reference.

4. In a device of the kind described, a television camera including viewing means adapted to be directed to a field including a reference and to provide an image of the field, scanning means energized by sweep voltages for scanning the image, said camera producing an electrical signal corresponding to the image, a pair of means gated in synchronism with the scanning means and receiving the output of said selective amplifier and alternately passing and blocking said output, one of said means passing said output corresponding to one-half of the image at one side of a vertical center line, another of said means passing said output corresponding to the other half of the image at the other side of the vertical center line, and a servo system responsive to the differential output of said pair of gated means for centering said viewing means about a vertical axis on the reference.

5. In a device of the kind described, a television camera adapted to be directed to a reference surrounded by a contrasting field and energized by horizontal and vertical sweep voltages for scanning an image of the reference and the surrounding field and producing an electrical signal corresponding thereto, a generator providing a reference voltage of the same frequency as one of the sweep voltages, a pair of amplifiers responsive to the signal and gated by opposite phases of the reference voltage and alternately blocking and passing the signal, said reference voltage being synchronized with the corresponding sweep voltage so that one of said gated amplifiers passes the signal only during scanning of one-half of the image, and so that the other gated amplifier passes the signal only during scanning of the other half of the image, a pair of integrating rectifiers receiving the outputs of said gated amplifiers, a pair of modulators energized by an alternating power source and controlled by the outputs of said integrating rectifiers, and a servo system responsive to the differential output of said modulators and arranged to direct said camera about one axis to the reference.

6. In a device of the kind described, a television camera including viewing means adapted to be directed to a field including a reference and to provide an image of the field, scanning means energized by sweep voltages for scanning the image, said camera producing an electrical signal corresponding to the image, a plurality of means responsive to the signal and gated in synchronism with the scanning means for alternately passing and blocking the signal, one of said means passing the signal corresponding to the upper half of the image and blocking the signal corresponding to the lower half of the image, another of said means passing the signal corresponding to the lower half of the image and blocking the signal corresponding to the upper half of the image, a servo system responsive to the differential output of said gated means for directing said viewing means about a horizontal axis to the reference, another of said means passing the signal corresponding to one-half of the image at one side of the vertical center line of the image and blocking the signal corresponding to the other half of the image, and another of said means passing the signal corresponding to the latter half of the image and blocking the signal corresponding to the other half of the image at one side of the vertical center line, and a second servo system responsive to the differential output of said last-mentioned pair of said gated means for centering said viewing means about a vertical axis on the reference.

7. In a device of the kind described, a television camera adapted to be centered on the brightest reference in a field and energized by horizontal and vertical sweep voltages for scanning an image of the field and producing an electrical signal corresponding thereto, a selective amplifier receiving the signal and increasing the signal amplitude corresponding to the reference and suppressing the signal amplitude corresponding to the remainder of the field, a generator providing a reference voltage of the same frequency as the vertical sweep voltage, a pair of amplifiers receiving the modified signal and gated by opposite phases of the reference voltage and alternately blocking and passing the modified signal, said reference voltage being synchronized with the vertical sweep voltage so that one of said gated amplifiers passes the modified signal only during scanning of the image at one side of the horizontal center line of the image and so that the other gated amplifier passes the modified signal only during scanning of the image at the opposite side of the horizontal center line, a pair of integrating rectifiers receiving the outputs of said gated amplifiers, a pair of modulators energized by an alternating power source and controlled by the outputs of said integrating rectifiers, a servo system responsive to the differential output of said modulators and arranged to direct said camera about a horizontal axis to the reference, a second generator providing a second reference voltage of the same frequency as the horizontal sweep voltage, a second pair of amplifiers receiving the modified signal and gated by opposite phases of the second reference voltage and alternately blocking and passing the modified signal, said second reference voltage being synchronized with the horizontal sweep voltage so that one of said gated amplifiers passes the modified signal only during scanning of the image at one side of a vertical center line of the image and so that the other gated amplifier passes the modified signal only during scanning of the image at the opposite side of the vertical center line, a second pair of integrating rectifiers receiving the outputs of said second pair of gated amplifiers, a second pair of modulators energized by the alternating power source and controlled by the outputs of said second pair of integrating rectifiers, and a second servo system responsive to the differential output of said second pair of modulators and arranged to direct said camera about a vertical axis to the reference.

8. In a device of the kind described, a television camera adapted to be directed to the brightest reference in a field and including scanning means energized by sweep voltages for scanning the image, said camera producing an electrical signal corresponding to the image, a selective amplifier adapted to increase the signal amplitude corresponding to the reference and to suppress the signal amplitudes corresponding to the remainder of the field, said selective amplifier including a first stage of discrimination having a rectifier with non-linear resistance voltage characteristics and with an input terminal for receiving the signal and an output terminal maintained at a predetermined potential so that said rectifier passes only peak amplitudes in excess of the potential, a first amplifier for amplifying the peak signal amplitudes passed by said rectifier, a second stage of discrimination including a rectifier having a non-linear resistance voltage characteristic and receiving the output of said first amplifier and passing peak signal amplitudes and discriminating against lesser signal amplitudes, a second amplifier receiving the output of said second rectifier, and a third stage of discrimination including a third rectifier having an input terminal receiving the output of said second amplifier and having an output terminal, and means responsive to the output of said second amplifier for maintaining the output terminal of said third rectifier at a predetermined potential so that said third rectifier passes signal amplitudes only in excess of said potential, a plurality of means gated in synchronism with the scanning means for alternately passing and blocking the output of said selective amplifier, each of said means passing the output of said selective amplifier corresponding to one-half of the image and blocking the output of said selective amplifier corresponding to the other half of the image, and a servo system responsive to the differential output of pairs of said gated means for centering said camera on the reference.

References Cited in the file of this patent

UNITED STATES PATENTS

| | | |
|---|---|---|
| 2,155,402 | Clark | Apr. 25, 1939 |
| 2,403,387 | McLennan | July 2, 1946 |
| 2,403,975 | Graham | July 16, 1946 |
| 2,417,446 | Reynolds | Mar. 18, 1947 |
| 2,424,193 | Rost et al. | July 15, 1947 |
| 2,444,933 | Jasperson | July 13, 1948 |
| 2,448,007 | Ayres | Aug. 31, 1948 |
| 2,459,117 | Oliver | Jan. 11, 1949 |
| 2,480,868 | Marshall | Sept. 6, 1949 |
| 2,520,932 | Hoeppner | Sept. 5, 1950 |
| 2,529,666 | Sands | Nov. 14, 1950 |
| 2,532,063 | Herbst | Nov. 28, 1950 |